US011898392B2

(12) United States Patent
Rieboldt

(10) Patent No.: US 11,898,392 B2
(45) Date of Patent: Feb. 13, 2024

(54) HINGE CLOSURE

(71) Applicant: EMKA BESCHLAGTEILE GMBH & CO. KG, Velbert (DE)

(72) Inventor: Gerd Rieboldt, Gevelsberg (DE)

(73) Assignee: EMKA BESCHLAGTEILE GMBH & CO. KG, Velbert (DE)

( * ) Notice: Subject to any disclaimer, the term of this patent is extended or adjusted under 35 U.S.C. 154(b) by 924 days.

(21) Appl. No.: 16/769,737

(22) PCT Filed: Dec. 5, 2018

(86) PCT No.: PCT/DE2018/100994
§ 371 (c)(1),
(2) Date: Jun. 4, 2020

(87) PCT Pub. No.: WO2019/114873
PCT Pub. Date: Jun. 20, 2019

(65) Prior Publication Data

US 2021/0140212 A1 May 13, 2021

(30) Foreign Application Priority Data

Dec. 11, 2017 (DE) ..................... 10 2017 129 427.9

(51) Int. Cl.
*E05D 7/10* (2006.01)
*E05D 15/50* (2006.01)
*E05B 63/22* (2006.01)

(52) U.S. Cl.
CPC ............ *E05D 7/1061* (2013.01); *E05B 63/22* (2013.01); *E05D 15/505* (2013.01);
(Continued)

(58) Field of Classification Search
CPC ........... E05D 7/1061; E05D 7/10; E05D 7/12; E05D 7/123; E05D 7/125;
(Continued)

(56) References Cited

U.S. PATENT DOCUMENTS 3,338,609 A * 8/1967 Banas .................... B64D 25/14
16/229
4,811,518 A * 3/1989 Ladisa .................. E05D 15/502
49/382
(Continued)

FOREIGN PATENT DOCUMENTS

DE 33854 11/1964
DE 4108381 A1 9/1992
(Continued)

OTHER PUBLICATIONS

PCT, English Translation of International Preliminary Report on Patentability and Written Opinion, International Application No. PCT/DE2018/100994, 10 pages (dated Jun. 16, 2020).

*Primary Examiner* — Victor D Batson
*Assistant Examiner* — Carl J Carlson
(74) *Attorney, Agent, or Firm* — Thompson Hine LLP

(57) ABSTRACT

A hinge closure (1) including a first hinge element (2) for arrangement on a door (4) and a second hinge element (3) for arrangement on a door frame, wherein the first hinge element (2) and the second hinge element (3) interlock via a locking device (7) an actuating device (6) actuates the locking device (7), and an emergency unlocking device (8) unlocks the two hinge elements (2, 3). In another embodiment, a door (4) includes such a hinge closure (1).

16 Claims, 8 Drawing Sheets

(52) U.S. Cl.
CPC ..... *E05Y 2201/214* (2013.01); *E05Y 2201/22* (2013.01); *E05Y 2900/132* (2013.01)

(58) Field of Classification Search
CPC . E05D 2007/128; E05D 15/50; E05D 15/505; E05D 15/507; E05B 63/22; E05Y 2201/214; Y10S 292/37; Y10S 292/0964; Y10T 292/0964; Y10T 292/1016
USPC .................. 16/254, 257, 258, 259, 230, 231
See application file for complete search history.

(56) References Cited

U.S. PATENT DOCUMENTS

| | | | | |
|---|---|---|---|---|
| 5,926,916 | A * | 7/1999 | Lee | E05D 15/502 16/230 |
| 6,442,896 | B1 | 9/2002 | Chapin, III | |
| 7,322,072 | B2 * | 1/2008 | Lin | H05K 5/0221 16/257 |
| 7,614,117 | B2 * | 11/2009 | Selvaraj | E05D 7/121 16/258 |
| 7,810,862 | B2 * | 10/2010 | Smith | B60R 7/04 220/817 |
| 9,834,966 | B2 * | 12/2017 | Alfredsson | E05D 15/505 |
| 10,280,665 | B2 * | 5/2019 | Rieboldt | E05D 7/1061 |
| 2018/0258675 | A1 | 9/2018 | Rieboldt et al. | |

FOREIGN PATENT DOCUMENTS

| | | | |
|---|---|---|---|
| DE | 202004003247 | U1 | 4/2004 |
| DE | 102015117505 | B3 | 2/2017 |
| WO | 2012/123776 | A1 | 9/2012 |

* cited by examiner

HINGE CLOSURE

TECHNICAL FIELD

The disclosure relates to hinge closures and more particularly to hinge closures having a first hinge element for arrangement on a door and a second hinge element for arrangement on a door frame, wherein the first hinge element and the second hinge element are interlockable via a locking device and wherein the locking device is actuatable via an actuating device. In addition, the disclosure relates to a door with a hinge closure.

BACKGROUND

Hinge closures are to be broadly understood as such elements which are used on the one hand as hinges, but on the other hand are also used as closures so that said hinge closures have a dual function in this respect.

If such a hinge closure is used, for example, on a door, the door can thus be pivoted about the hinge closure and, as a result, opened, however, the door can also be locked via the hinge closure. The range of applications of such hinge closures consequently extends to quite different areas of technology. They can be used, for example, not only on doors but also on windows, flaps, covers, hatches or other pivotable closing elements.

As a rule, hinge closures comprise two hinge elements which are movable with respect to one another, one of which is arranged for the most part on a non-movable door frame and one on a door which is pivotable with respect to the door frame. The two hinge closures, in this case, are connected to be rotatable so that the door can be pivoted in relation to the door frame. In addition, the two hinge elements are connected to be releasable via a locking element so that said hinge elements can lock the door in the connected position in the manner of a closure.

In the unlocking position, the two hinge elements are no longer connected so that in said position the door is no longer fixed in relation the frame at least in the region of the corresponding hinge closure and can be opened.

On account of the dual function, multiple hinge closures are frequently arranged on a door. As a rule, they are arranged on the same side of the door but in opposite end regions of the door. The end region is to be understood here as the region in the vicinity of the door edges at the edge of the door, on which hinges or closures are usually arranged. When all hinge closures are in the locking position, the door is fixed in relation to the frame and is consequently not movable. In order to open the door, the hinge closure or the hinge closures, which are arranged in an end region of the door, can be transferred from the locking position into the unlocking position and the door can then be pivoted about the locked hinge closures of the other end region. The locked hinge closures then function as hinges.

In addition, it is also possible to transfer all hinge closures of the door into the unlocking position so that the door can then no longer be pivoted only in relation to the frame but can also be removed from said frame.

In order to transfer a hinge closure from the locking position into the unlocking position, it mostly comprises an actuating device which, as a rule, is designed in the manner of a pivotable hand lever. The locking units of the hinge closures can be actuated and the hinge closure locked and unlocked via said actuating device. Such a hinge closure is described, for example, in DE 10 2015 117 505.

It is true that such hinge closures have proved their worth in practice but it has also been shown to be disadvantageous that the actuating devices are accessible from only one side of the hinge closure. This can result in problems when spaces which are otherwise closed by way of the door and in which people can also sometimes reside, are to be locked. For example, it is possible for a door to close or to be unintentionally locked and the actuating devices for unlocking the hinge closures then only to be reachable from the outside of the door. Anyone situated in a room locked in this way has no possibility of getting to the hinge closures that are arranged on the outside and of unlocking them in order to open the door independently. In such a situation such people are consequently dependent on outside assistance and cannot release themselves independently. Sometimes, there can consequently even be a danger to life or limb if said persons do not receive outside assistance.

SUMMARY

Proceeding from here, the object of the invention is to provide a hinge closure which reduces a risk of entrapment.

In an embodiment, the disclosed hinge closure includes a first hinge element for arrangement on a door; a second hinge element for arrangement on a door frame; a locking device for interlocking the first hinge element and the second hinge element; an actuating device for actuating the locking device; and an emergency unlocking device for unlocking of the two hinge elements.

As a result of an emergency unlocking device, the two hinge elements can be separated from one another quickly and reliably in an emergency situation so that the door can be opened independently of actuation of the actuating device. The emergency unlocking device can be positioned independently of the actuating device and independently of the locking unit. A person trapped in a room is no longer reliant on the actuation of the actuating device for unlocking the hinge elements.

With regard to the arrangement of the emergency unlocking device, it has proved to be advantageous when the emergency unlocking device and the actuating device are arranged on opposite sides of the hinge closure. The emergency unlocking device can be actuated from the opposite side of the hinge closure on account of said arrangement. If the hinge closure is used, for example, on a door, the actuating device can be actuated from outside and the emergency unlocking device from inside. The emergency unlocking device is also actuatable by a person trapped in a room so that said person is able to release himself by his own efforts even in an emergency situation.

In a development of the hinge closure, it has proved to be advantageous when the emergency unlocking device is couplable with the locking device and/or with the actuating device. Where there is a coupling, the locking device and/or the actuating device can be actuated via the emergency unlocking device and the two hinge elements can thus be separated from one another. As the locking device is also actuatable via the actuating device, it is possible for the emergency unlocking device to be able to be couplable either with the actuating device and/or with the locking device for unlocking. In all cases, this can result in the hinge closure being unlocked.

With regard to the actuating device, it has proved to be advantageous when said actuating device is designed as a pivotable lever, via which the two hinge elements are unlockable from one another, in particular in a manual manner. The actuating device can be mounted on the first hinge element so as to be pivotable and for unlocking can be pivoted in relation to said hinge element. The actuating device can be arranged in the locked position in such a manner that it does not protrude beyond the contour of the hinge closure. In addition, the actuating device can be designed in such a manner that it can be engaged behind such that the actuating device can be actuated by hand in a simple manner.

The locking unit can comprise a movable locking bar or can be designed as such a locking bar. The locking unit can be guided linearly in the first hinge element and can be movable back and forth via the actuating device and/or via the emergency unlocking device. In the locked position, the locking unit can interact with the second hinge element in such a manner that the two hinge elements are rotatable relative to one another. The second hinge element can comprise a locking bolt which can be connected via the locking unit, in particular in a positive locking manner, to the first hinge element. The axis of rotation of the two hinge elements can extend through the locking bolt, in particular the axis of rotation of the hinge element corresponds to the axis of symmetry of the locking bolt. If the locking bar is moved out of its locked position into an unlocked position, the positive locking closure can thus be lifted and the locking bolt released. In said position, the two hinge elements can be separated from one another. The locking unit can be pre-tensioned in the direction of the locking position, in particular via a spring. In the case of unlocking or emergency unlocking, the locking unit can be moved in opposition to the spring force into the unlocked position.

The locking unit and the actuating unit can be coupled together in such a manner that a pivoting movement of the actuating unit initiates a linear movement of the locking unit. In addition, it is also possible for the actuating unit to be able to be moved at a free angle at which the locking unit is initially not also moved. In addition, the elements can be coupled in such a manner that actuation of the locking unit, for example via the emergency unlocking device, also results in a movement of the actuating unit.

In a development of the invention, it is proposed that the hinge closure comprises a blocking device, which comprises a closing cylinder and a blocking element, for blocking the actuating device and/or the locking device. A movement of the blocked elements can be prevented via the blocking device such that the two hinge elements cannot be separated from one another. As an alternative to this, it is also possible for the blocking device to move the actuating device and the locking device out of engagement such that the actuating device is certainly able to be actuated but said movement is not transmitted to the locking unit and in this regard does not result in unlocking. The closing cylinder can be designed, for example, as an actuating cylinder or as a plate cylinder. In addition, it is also possible, however, for the blocking device not to comprise a closing cylinder and/or a blocking element. The blocking device can, in such a case, be designed, for example, as a combination lock, as an electric lock, as a Chubb lock or the like.

With regard to the blocking device, it is further proposed that the closing cylinder is arranged on the actuating device and is movable back and forth between a blocking position and an unblocking position, wherein the closing cylinder interacts with the blocking element in the blocking position in such a manner that the actuating device is fixed in relation to the blocking element. The blocking element can be arranged on the first hinge element. The closing cylinder and the blocking element can interact in the manner of a door lock. A key or a tool can be insertable from outside into the locking cylinder, which then enables a rotation of the closing cylinder such that said closing cylinder can be movable back and forth between the blocking position and the unblocking position. The closing cylinder can comprise a projection, a locking lug or a locking cam, which can undercut the blocking element in the locked position. As a result of such an undercut, there is a positive locking connection and the actuating device can no longer be moved in relation to the first hinge element.

In addition, it has proved to be advantageous when the blocking element and/or the closing cylinder are designed in such a manner that the actuating device is transferable into the locking position even when the closing cylinder is in the blocking position. Said design makes it possible for the actuating device to be able to be moved into the locked position, even when the closing cylinder is situated in the locked position. It is not necessary only to move the closing cylinder into the blocking position once the actuating device is already situated in its locking position. Very quick locking can be made possible in this way. In addition, the elements do not become damaged, in particular the closing cylinder and/or the blocking element, as is the case, for example, with commercially available door locks when the door is slammed shut, the locking bar of the door lock protrudes, however, and then strikes against the frame of the door. The closing cylinder and/or the blocking element can comprise snap-type elements, in particular spring-loaded snap-type elements, in the manner of a lock latch, which deflect during an operation to lock the actuating device. In this way, a blocked closing cylinder can also interact with the blocking element or engage in the blocking element or undercut said blocking element.

With regard to the emergency unlocking device, it has proved to be advantageous when said emergency unlocking device comprises an emergency actuation region for emergency unlocking via the locking device and/or the actuating device. The emergency unlocking device can interact with the locking device and/or the actuating device via the emergency actuation region and can transfer them from the locking position into the unlocking position for emergency unlocking. The emergency actuation region can be arranged on a side of the emergency unlocking device which faces the locking unit and/or the actuating device. On an opposite side, the emergency unlocking device can comprise a handling region, via which the emergency unlocking device can be actuatable. The handling region can protrude beyond the door and can be pressed in the direction of the door for emergency unlocking. This also causes the emergency actuation region to move. The handling region can be designed in a mushroom-shaped manner for reliable actuation and can be provided, for example, with handling instructions which refer to the possibility of emergency unlocking.

According to an advantageous design, it is additionally provided that the emergency actuation region comprises a first effective contour for unblocking the blocking device and a second effective contour for emergency unlocking of the locking device and/or of the actuating device.

The emergency unlocking device can both unblock the blocking device and unlock the locking device and/or the actuating device. In this way, the hinge closure can be reliably unlocked in an emergency even if the blocking element is blocked.

In addition, it has proved to be advantageous when the effective contours are arranged in such a manner that in the case of emergency unlocking, first of all the blocking device is unblocked via the first effective contour and then, for unlocking the hinge elements, the second effective contour unlocks the locking device and/or the actuating device. In the case of emergency unlocking, in terms of time, the blocking device can be unblocked first of all, which then permits a movement of the actuating device and/or the locking element. Where there is further actuation, the locking device and/or the actuating device are then unlocked so that the two hinge elements can be separated from one another. The two different, successive effective mechanisms are not visible to the person actuating the emergency unlocking device, in particular as they follow one another directly during emergency unlocking and very quick emergency unlocking is thus made possible. The effective contours can be arranged one behind another in the emergency unlocking direction, in particular the second effective contour is arranged at the end of the effective region and the first effective contour is arranged below the second effective contour.

According to an advantageous development, it is proposed that the locking device comprises a coupling contour which is designed corresponding to the second effective contour of the emergency unlocking device, wherein in the case of emergency unlocking, the second effective contour interacts with the coupling contour. As a result of interaction between the second effective contour and the coupling contour, the locking element can be transferred from the locking position into the unlocking position. The locking unit can comprise a recess, in which the emergency unlocking device can enter during emergency unlocking and can thus move or unlock the locking unit. The emergency actuation direction and the unlocking direction, in which the locking unit is moved during emergency unlocking, can be arranged at right angles to one another.

It has additionally proved to be advantageous when the first effective contour is realized as a notch and the second effective contour as a run-on slope. In the case of emergency unlocking, the first effective contour can move into engagement with the blocking element and move said blocking element in such a manner that it is unblocked. The movement can then result in unblocking of the blocking element so that the blocking element and the closing cylinder move out of engagement. The coupling contour of the locking element can also be designed as a run-on slope precisely as the second effective contour. In the case of emergency unlocking, the two run-on slopes can come into contact with one another in such a manner that the emergency unlocking device can move the locking unit.

With regard to the emergency unlocking device, it has proved to be advantageous when said emergency unlocking device is designed as a drive-in bolt. A drive-in bolt enables very simple and self-explanatory actuation. In the event of an emergency, all that needs to be done consequently is merely applying a pressure force onto the emergency unlocking device and pushing said emergency unlocking device in the direction of the door. In addition, the emergency unlocking device can also be designed as a key, as an unlocking pin, as a push button or as a pressure bolt.

In a development of the invention, the emergency unlocking device can be secured in a basic position against a movement in the opposite direction to the emergency unlocking direction. Such securing prevents the emergency unlocking device being able to be removed, for example, from a door. The basic position can correspond to the position in which the emergency unlocking device has not been actuated. In said position, the handling region of the emergency unlocking device protrudes the furthest beyond the door. The emergency unlocking device can comprise a notch which interacts with a projection or a clip in the basic position so that movement in the opposite direction to the emergency unlocking direction is blocked. In addition, it is also possible for the emergency unlocking device to be secured in another manner, for example via a guide with two stops which delimit the maximum movement.

It has additionally proved to be advantageous when the emergency unlocking device is guided in a guide element and is sealed via a sealing element in relation to said guide element. A gas exchange can be prohibited via the sealing element so that the hinge closures can also be used in spaces which are to be closed in an air-tight manner. The emergency unlocking device can comprise a groove in which the sealing element is arranged. The sealing element can be designed as an O-ring seal. The guide element can be arranged in the door and can reach from one side of the door to the other side of the door. The projection or clip for preventing the emergency unlocking device being pulled out can be arranged on or on the guide.

Furthermore, with regard to the problem depicted in the introduction and to the task set, a door with a hinge closure which is designed in the manner described above is proposed.

With regard to the door, it has proved to be advantageous when at least one hinge closure is arranged on each of two opposite end regions of the door. The door can be, for example, angular, in particular rectangular, and the hinge closures can be arranged in the region of two opposite end regions. In addition, however, it is also possible for the door to be designed in a round manner. Even in the case of such a door, the hinge elements can be used on opposite end regions.

BRIEF DESCRIPTION OF THE DRAWINGS

Further details and advantages of the present invention are to be explained in more detail below with the aid of the exemplary embodiments shown in the figures, in which.

Hinge closures 1 comprise for the most part two hinge elements 2, 3 which are coupled with one another so as to be pivotable and releasable and serve, on the one hand, as a hinge so that a door 4, for example, can be opened or closed, on the other hand, however, also as a closure in order to lock a door 4.

DETAILED DESCRIPTION

The term "door" is to be broadly understood in the sense of said invention as pivotable closing elements which are movable back and forth between an open position and a closed position. Along with normal doors in the actual sense, said term consequently also includes, for example, flaps, hatches, covers, windows and the like.

The arrangement of four hinge closures 1 on a door 4 and the various possibilities for opening the door are now to be described below by way of FIG. 9 before the more precise design of the hinge closures 1 is then discussed in more detail.

Figure 9:
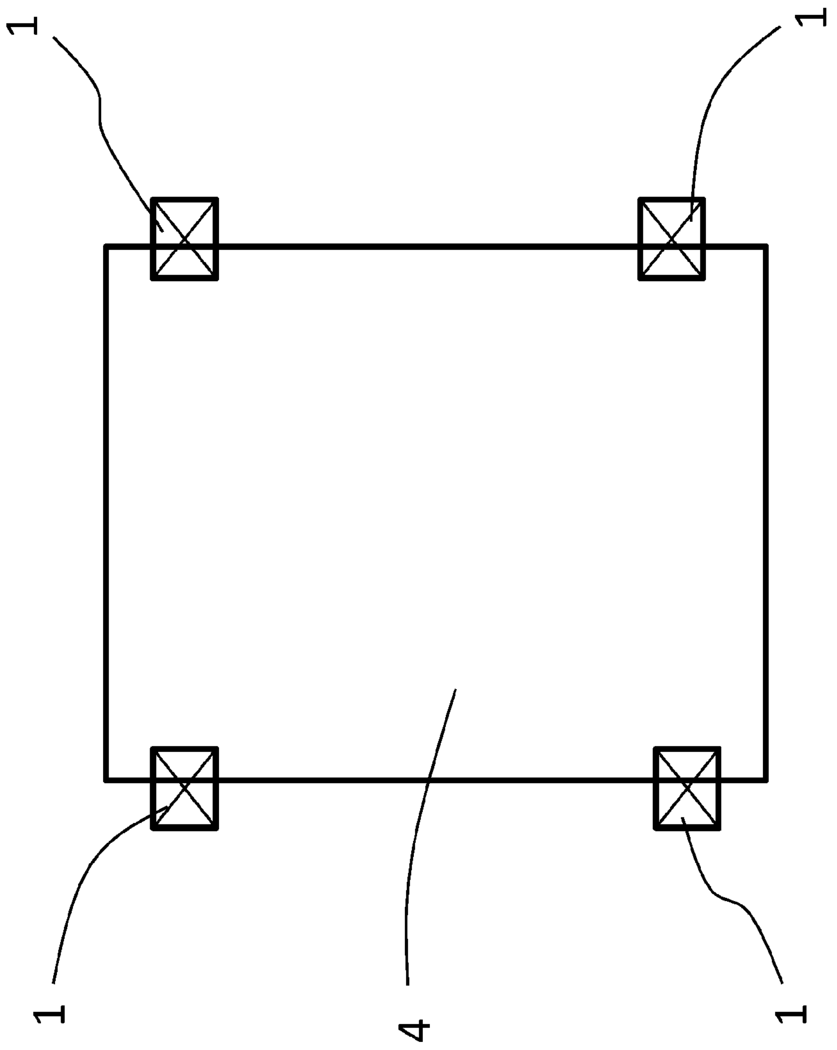
FIG. 9 shows a schematic view of a door with four hinge closures.

FIG. 9 shows the outside of a door 4 with four hinge closures 1 which are arranged on the door 4. The frame of the door 4, on which each of the second hinge elements 3 of the hinge closures 1 are arranged, is not also shown in FIG. 9.

When all four hinge closures 1 are situated in the locked position, the door 4 is fixed in relation to the frame and cannot be opened. The hinge closures 1 then act correspondingly as closures which lock the door 4.

In order to open the door 4, both hinge closures 1, which are arranged on one side of the door 4, have to be unlocked. If, for example, the two right-hand hinge closures 1 are unlocked, the door 4 can thus be pivoted about the two hinge closures 1 which are on the other side and are still in the locked position. In said position, the two right-hand hinge closures 1 then act as hinges. In addition, all four hinge closures 1 can also be unlocked so that the door 4 can be removed in its entirety from the frame.

Figure 1A:
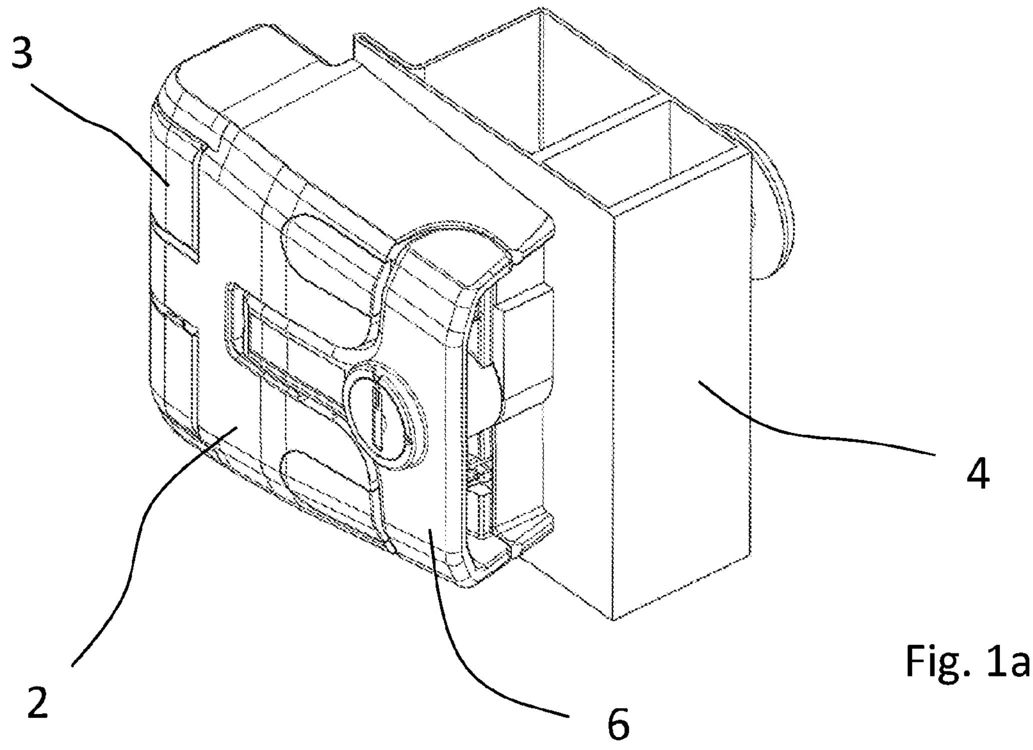
FIGS. 1*a, b* show a front and a rear view of a mounted hinge closure.
Figure 1B:
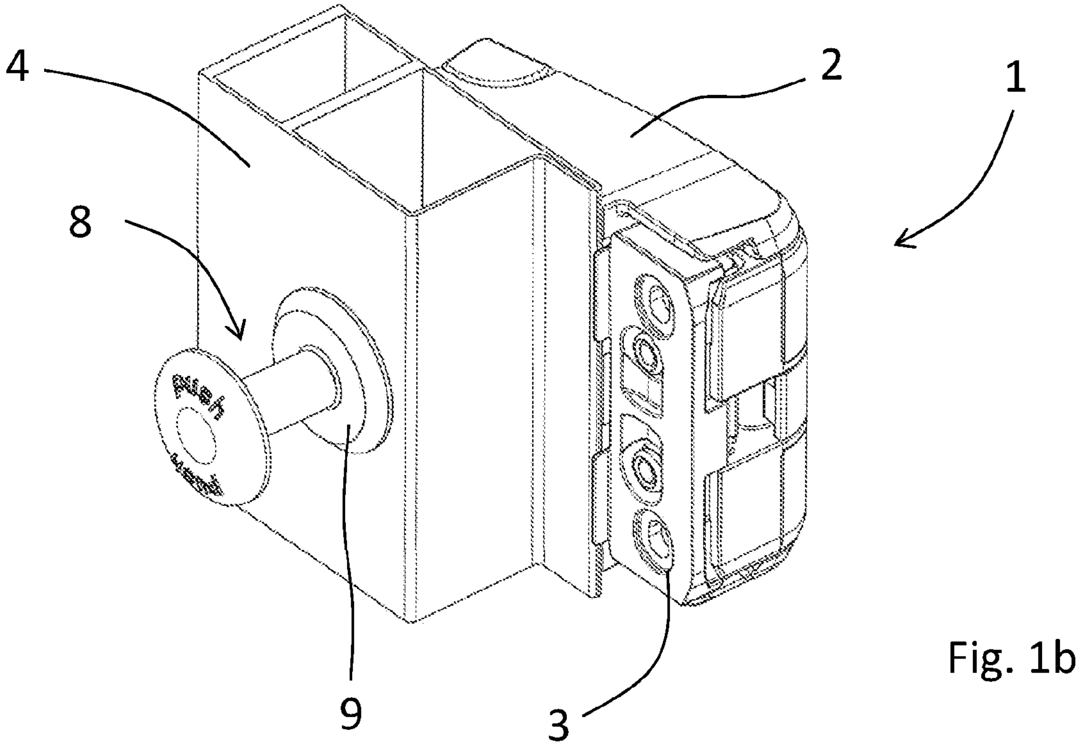
Figure 2:
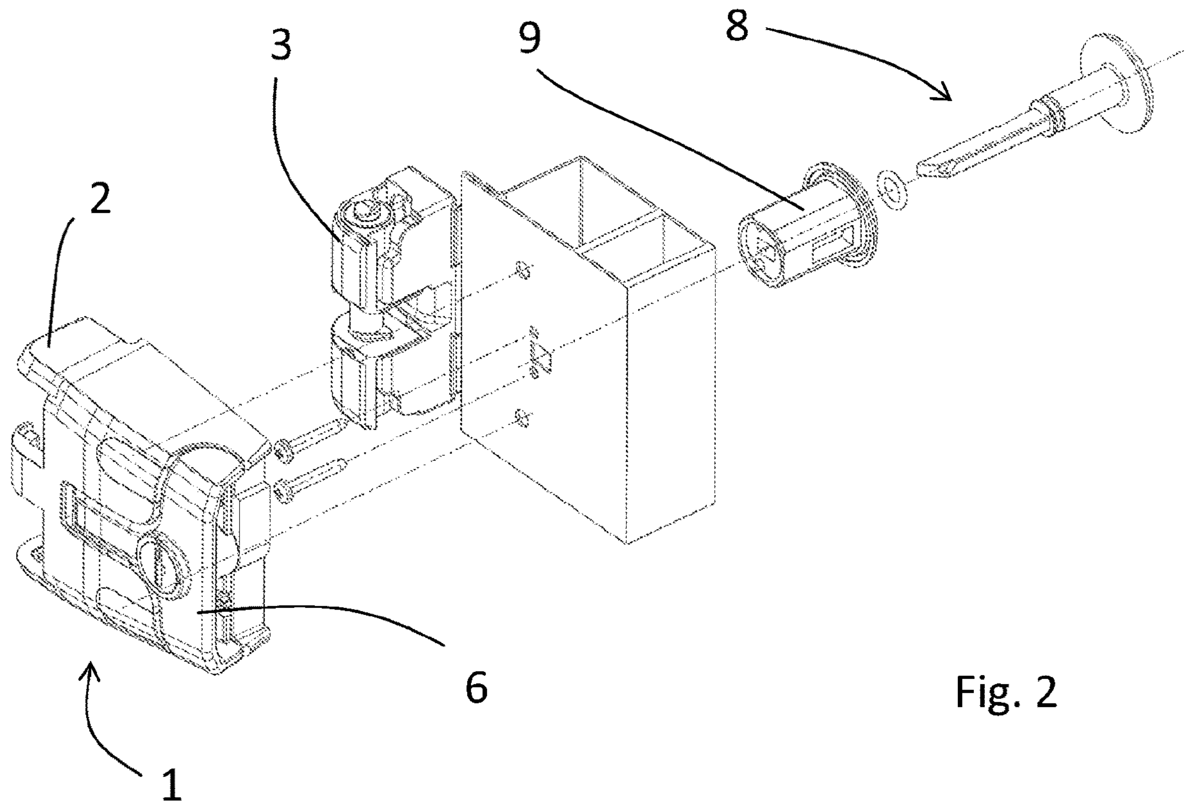
FIG. 2 shows an exploded representation of the hinge closure according to FIG. 1*a;*

In order to transfer the hinge closures 1 from the locked position into the unlocked position, they each comprise an actuating device 6, which is shown, for example, in FIGS. 1 and 2. As the hinge closures 1 according to the representation in FIG. 9, however, are all arranged on the outside of the door 4, the corresponding actuating devices 6 can also only be actuated from the outside of the door 4. It is thus not possible to unlock the hinge closures 1 from the interior using the actuating devices 6 and then to open the door 4. However, in order then, nevertheless, also to be able to unlock the hinge closures 1 from the interior in an emergency situation, they each comprise an emergency unlocking device 8 which is actuatable from the interior in the event of an emergency. Said emergency unlocking device 8 is described in more detail below with regard to FIGS. 1 to 7.

In the representation in FIGS. 1*a* and 1*b*, the hinge closure 1 is shown from two different sides on a door 4 in the mounted state. The first hinge element 2, in this case, is arranged on the door 4 and the second hinge element 3 is arranged on a door frame which is not shown in the figures. The side of the door 4, on which the hinge element 2 is arranged, corresponds in the exemplary embodiment to the outside of the door 4, the opposite side of the door 4 corresponding to the inside.

An exploded representation of the hinge closure 1 is shown in FIG. 2, the two hinge elements 2, 3 being shown separately from one another. In addition, it is also possible to see the emergency unlocking device 8 which is mounted from the inside of the door 4 and, in the mounted state, protrudes in part beyond the inside of the door 4, as can also be seen in FIG. 1*b*.

Figure 3A:
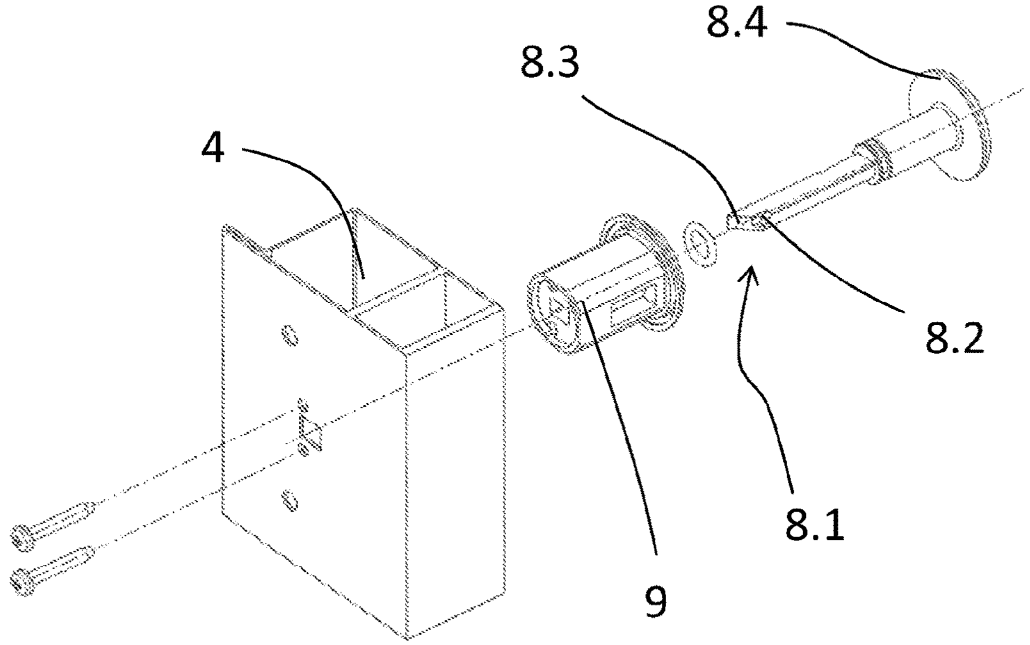
FIGS. 3*a-c* show views of details of the emergency unlocking device in an exploded view and in the mounted state from two different sides.
Figure 3B:
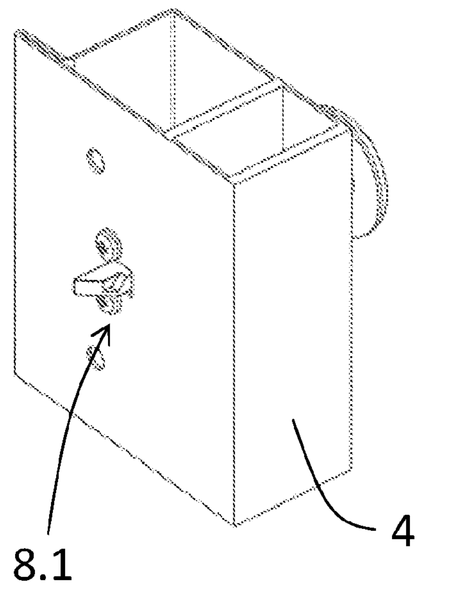
Figure 3C:
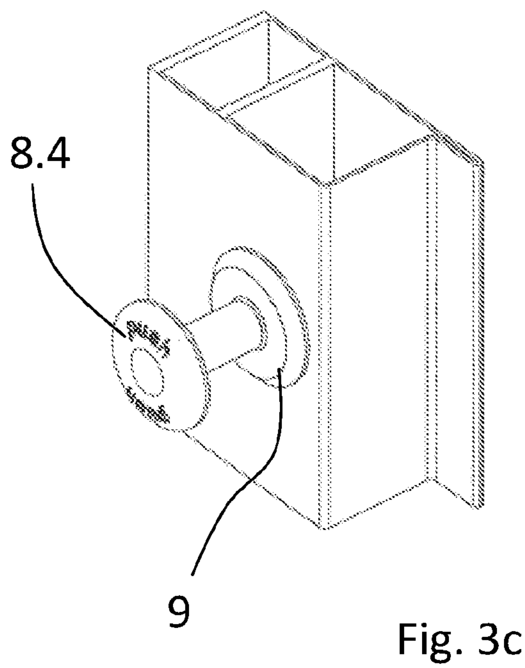
Figure 4A:
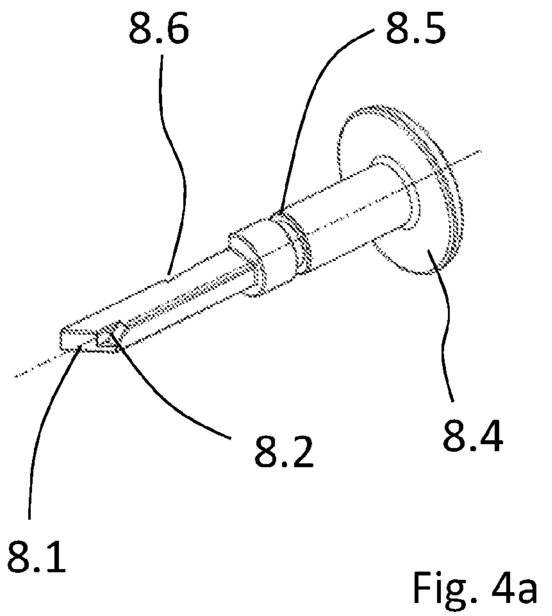
FIGS. 4*a, b* show perspective views of details of the emergency unlocking device.
Figure 4B:
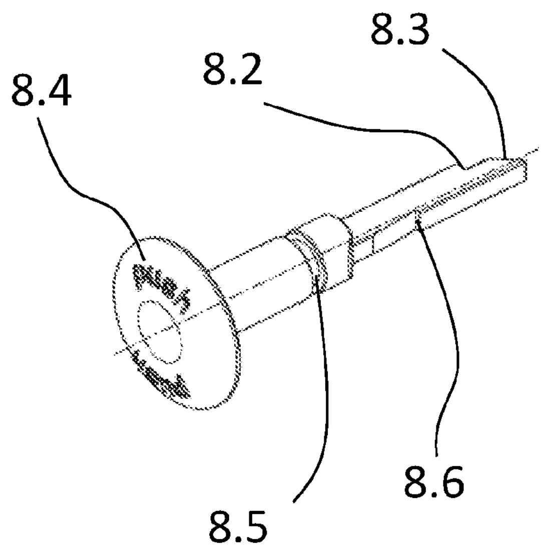
Figure 6B:
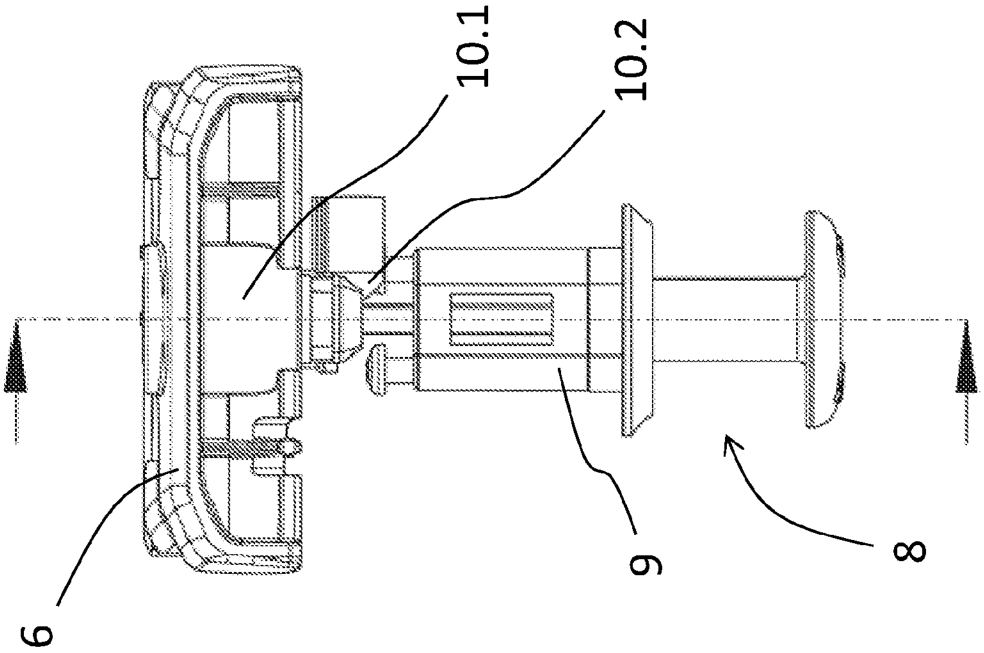
FIGS. 6*a, b* show sectional views of the hinge closure in a locked and blocked position.
Figure 6A:
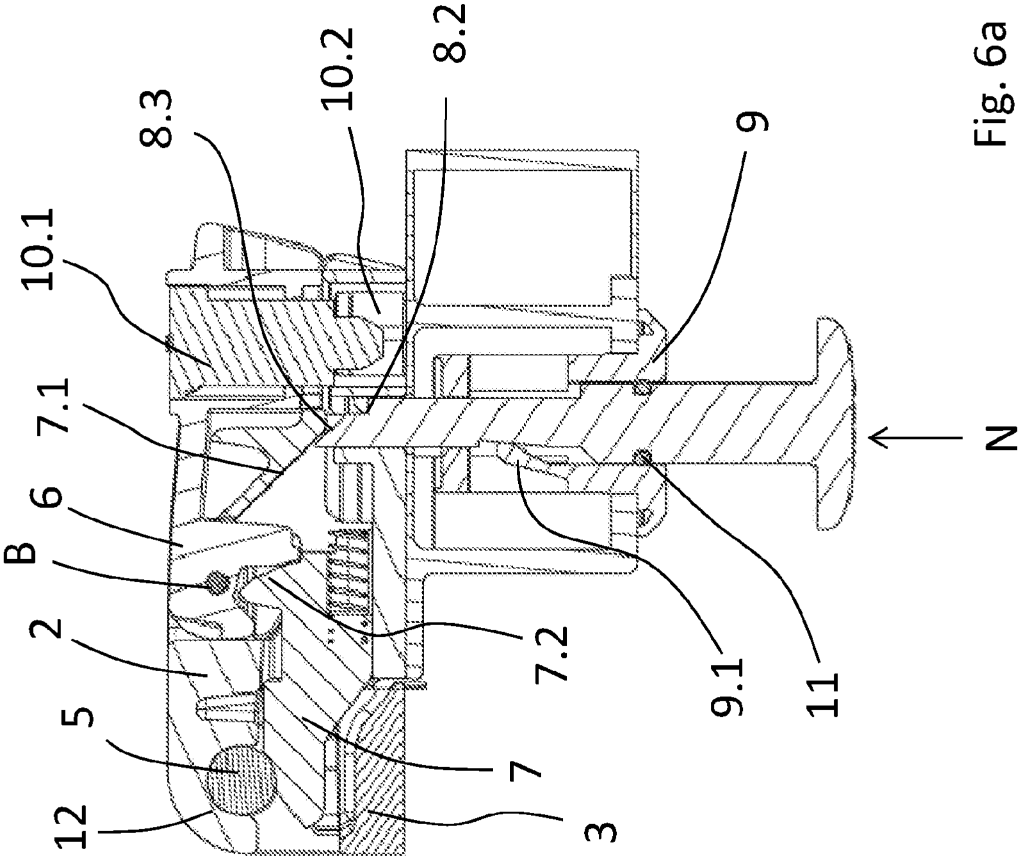
Figure 7B:
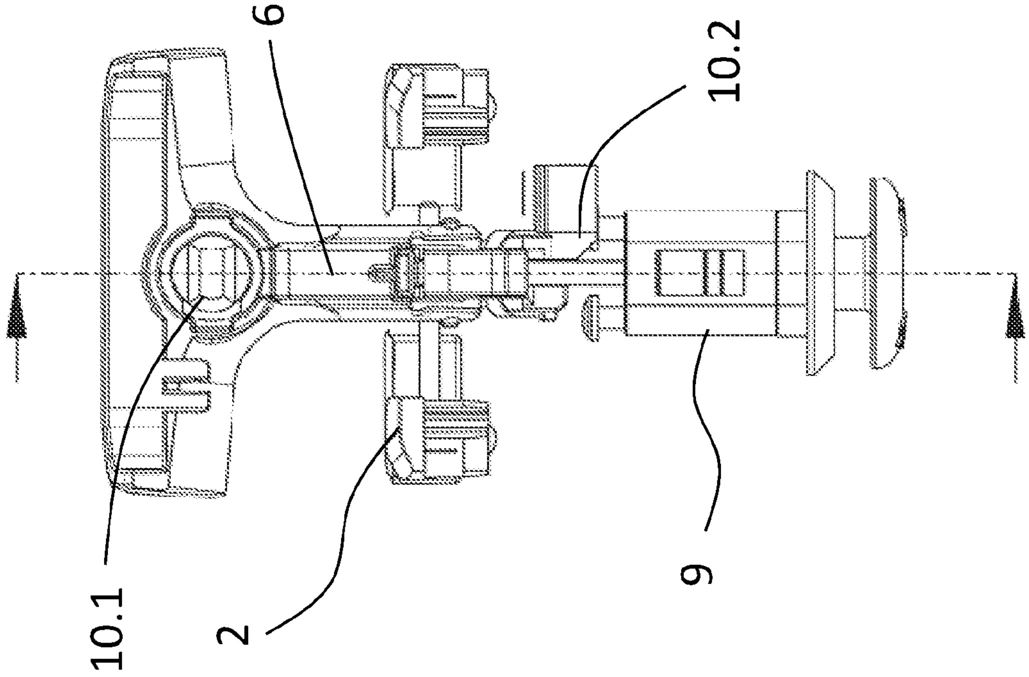
FIGS. 7*a, b* show sectional views of the hinge closure in unlocked position.
Figure 7A:
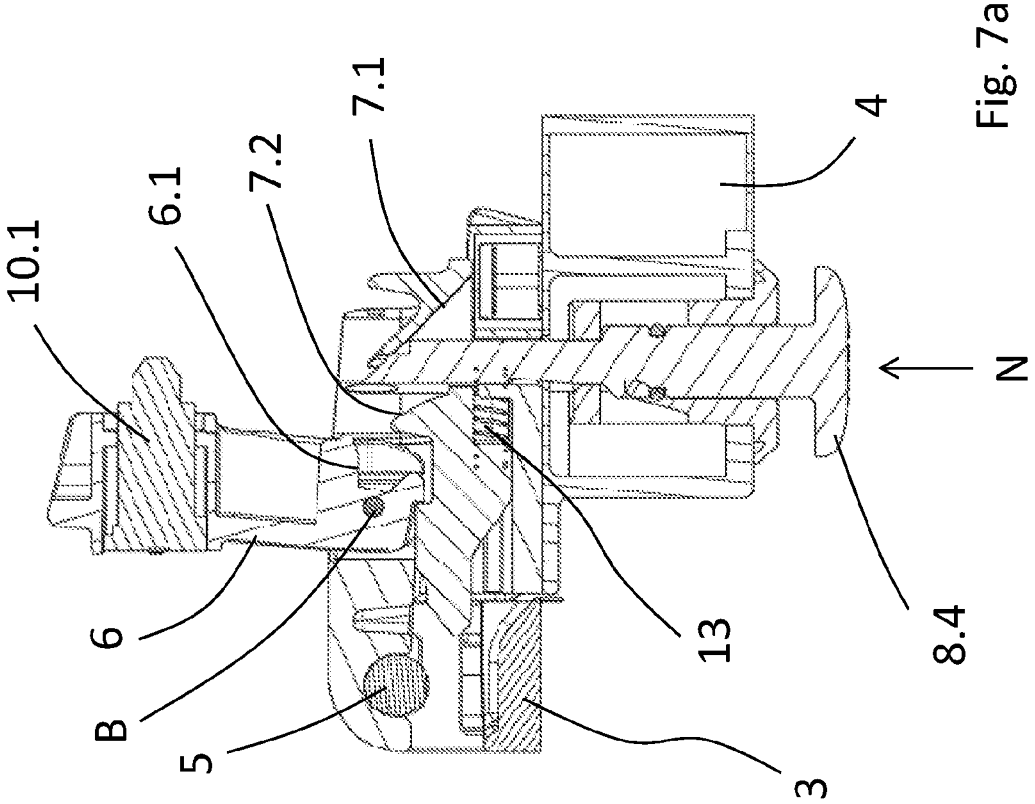

FIG. 3*a* to *c* correspond to FIGS. 1*a, b* and 2, the hinge elements 2, 3 not being shown as well. The emergency unlocking device 8 is arranged in the door 4 via a guide element 9 in the form of a bearing bush. Said guide element 9 passes through the door 4 and is connected to said door by means of screws. On the inside of the door 4, the guide element comprises a rosette-like projection which, in the mounted state, rests on the inside of the door 4. In the mounted position, the emergency unlocking device 8 or an effective region 8.1 of the emergency unlocking device 8 projects through the door 4 so that, in the mounted state, it extends into the first hinge element 2. More detailed explanation is now to be provided below by way of the further figures, in particular by way of the various positions shown in FIGS. 5 to 7. FIGS. 5*a*, 6*a* and 7*a*, in this case, each show a first sectional view of the hinge closure 1, FIGS. 5*b*, 6*b* and 7*b* show a second sectional view perpendicular to the first sectional view.

Figure 5B:
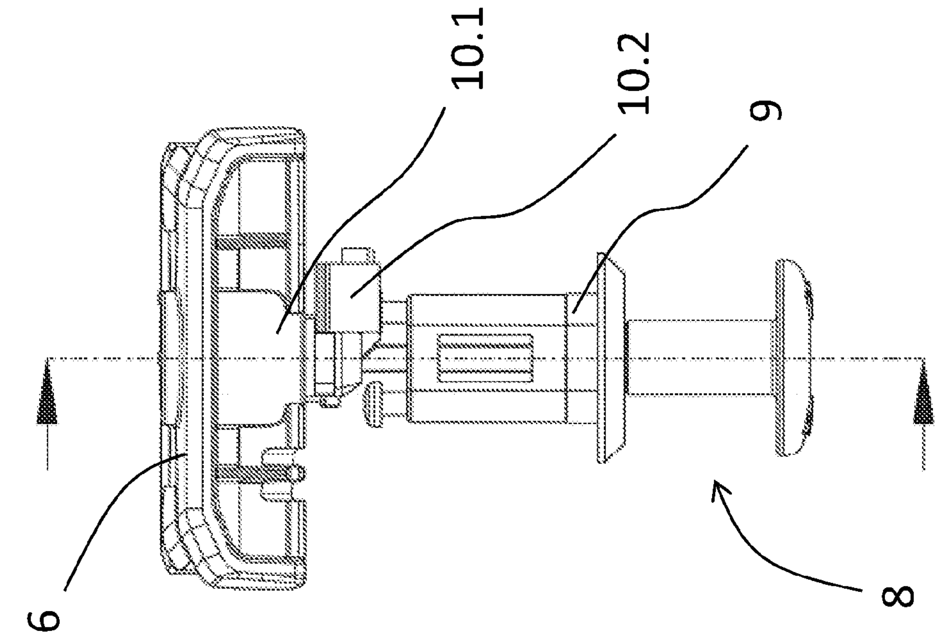
FIGS. 5*a, b* show sectional views of the hinge closure in a locked and blocked position.
Figure 5A:
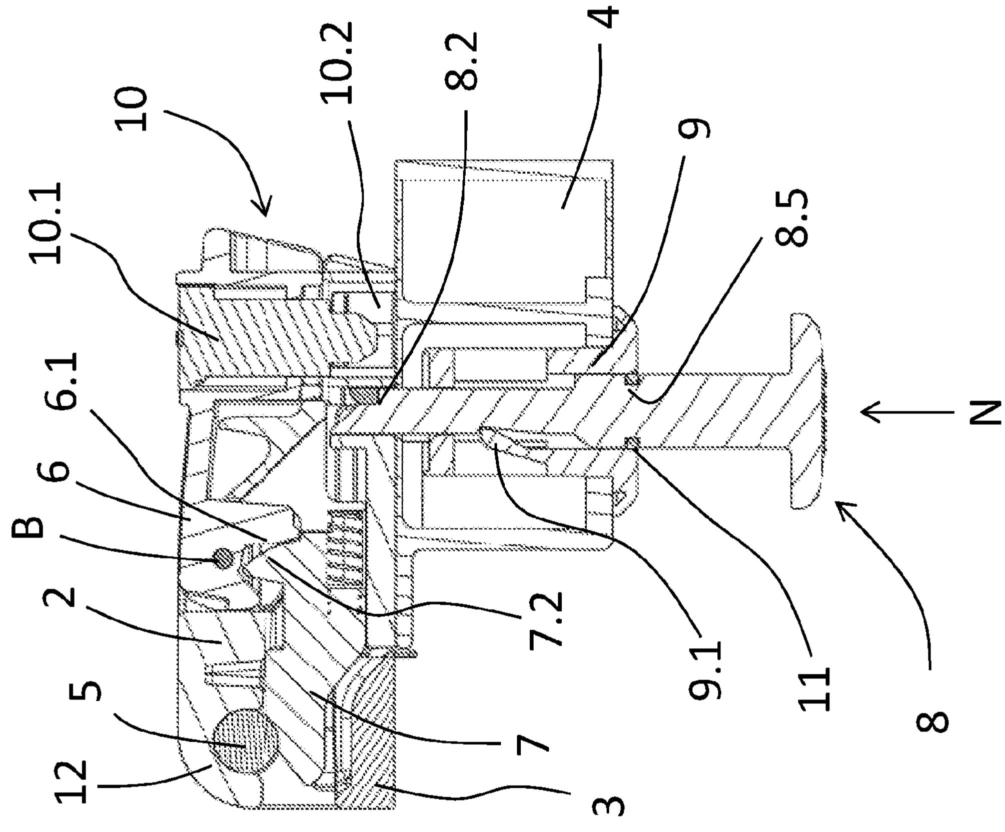

In the representation in FIG. 5*b*, the hinge closure 1 is shown in a locked and blocked position. In said position, the actuating device 6 is pivoted into the contour of the hinge closure 1 and the emergency unlocking device 8 is situated in the basic position. The locking device 7 is situated in the locked position and holds the bolt 5, which is arranged on the second hinge element 3, in the receiving means 12 arranged on the first hinge element 2. In said position, the first hinge element 2 can be pivoted about the longitudinal axis of the bolt 5 and the door 4 can be opened insofar as it is not still secured in another manner, cf. FIG. 8.

In addition, the hinge closure 1 according to FIG. 5 is situated in the blocked position. In said position, the actuating device 6 is blocked and cannot be pivoted about the actuating rotational axis B. The actuating device 6 comprises a closing cylinder 10.1 which, together with the blocking element 10.2, forms a blocking device 10. In the position shown in FIG. 5*b*, the closing cylinder 10.1 is in engagement with the blocking element 10.2 which is arranged on the first hinge element 2, so that the actuating device 6 cannot be pivoted. The locking device 7, in said position, abuts against a corresponding coupling edge 6.1 of the actuating device 6 via a coupling edge 7.2 and cannot be moved toward the actuating device 6 either on account of the blocking action of the blocking device 10.

If the two hinge elements 2,3 are then to be separated from one another in an emergency situation so that the door 4 can be opened, first of all the blocking device 10 has to be unblocked. The emergency unlocking device 8 comprises for this purpose a first effective contour 8.2 which is designed as a recess and can be seen in the enlarged representations in FIG. 4. In the locked and blocked position according to FIG. 5, said first effective contour 8.2 abuts against the blocking element 10.2. If the emergency unlocking device 8 is then actuated in the emergency actuation direction N, that is to say is moved upward according to FIG. 5*b*, the first effective contour 8.2 thus first of all unblocks the blocking element 10.2. Said blocking element moves out of engagement with the closing cylinder 10.1 on account of the movement of the emergency unlocking device 8 so that the actuating device 6 is then unblocked. Said position, which is still locked but already unblocked, is shown in FIGS. 6*a, b*. As can be seen, the emergency unlocking device 8 has already been displaced a little in the emergency actuation direction N.

If the emergency unlocking device 8 is moved even further in the emergency actuation direction N, the second effective contour 8.3, which is designed in the manner of a run-up slope, moves into abutment with the coupling contour 7.1 of the locking device 7. If the emergency unlocking device 8 is then moved further in the emergency actuation direction N, the locking device 7 is thus moved out of its locked position shown in FIG. 6 into the unlocked position shown in FIG. 7. In said position, the bolt 5 is no longer secured in the receiving means 12 so that the two hinge elements 2,3 are able to be separated from one another.

The locking device 7 is pretensioned in the direction of the locked position via a compression spring 13. In the event of emergency actuation, the locking device 7 is moved in the opposite direction to the spring force. On account of the contact between the coupling edge 7.2 of the locking device 7 and the coupling edge 6.1, the unlocking movement of the locking device 7 results in the actuating device 6 being rotated about the actuating rotational axis B and consequently being pivoted out of the contour of the hinge closure 1.

As can be seen in the basic position according to the representation in FIG. 5, the emergency unlocking device 8 additionally has a groove 8.5 in which a sealing element 11 in the form of an O-ring is received. The sealing element 11 seals the emergency unlocking device 8 in relation to the guide element 9 so that a gas exchange cannot take place between the interior and the exterior of the door 4.

In addition, the emergency unlocking device 8 is secured in the basic position against being pulled out of the guide element 9 or of the door 4. The emergency unlocking device 8 comprises for this purpose a latching edge 8.6 which, in the basic position, abuts against a projection 9.1 of the guide element 9, which projection is designed as a clip, so that it is not possible to pull out the emergency unlocking device 8.

How the emergency unlocking device 8 interacts with the closing element 10.2 for unblocking and with the closure element 7 for unlocking is to be described again below by way of FIGS. 8*a* and 8*b*. Certainly with regard to the structural design thereof, the emergency unlocking device 8 shown in FIGS. 8*a* and 8*b* comprises slight differences to the locking devices 8 shown in the remaining figures, however, these do not affect the method of operation, which is why the various emergency unlocking devices 8 are mutually interchangeable.

Figure 8B:
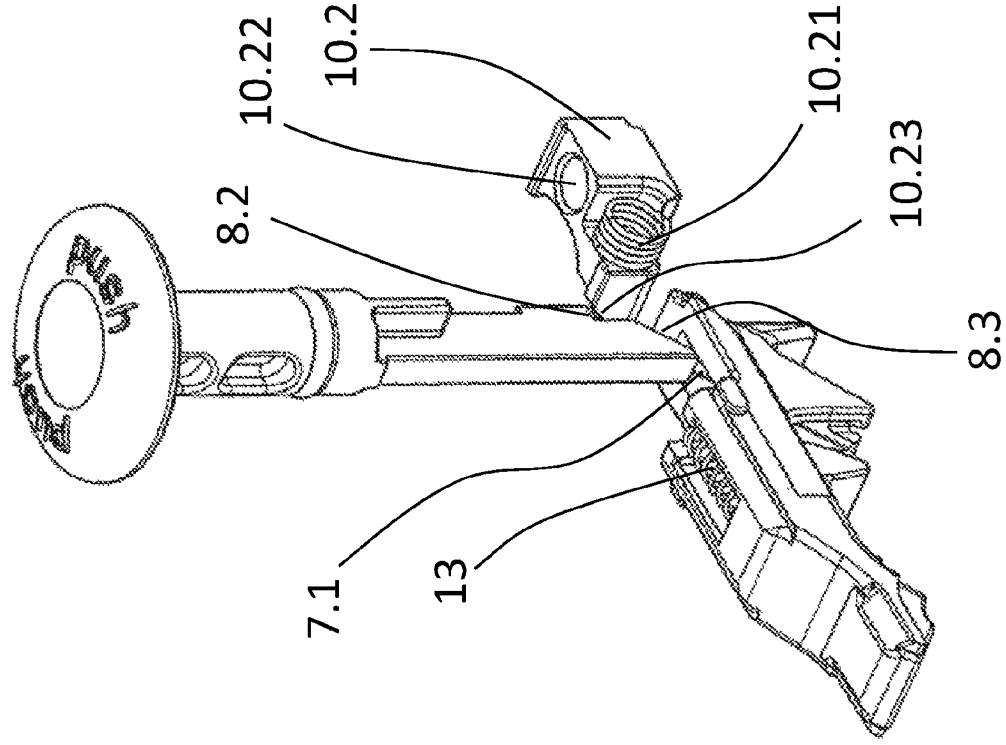
FIGS. 8*a, b* show perspective views of details of the emergency unlocking device interacting with a blocking element and a locking device.
Figure 8A:
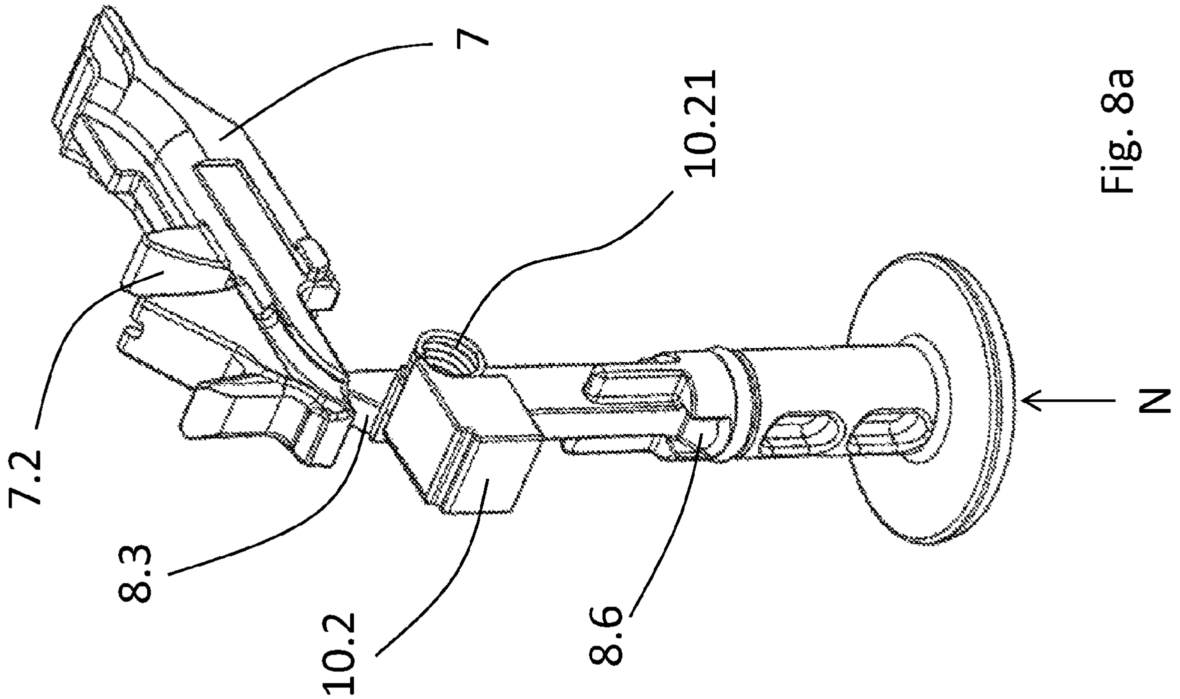

In FIGS. 8*a* and 8*b*, the emergency unlocking device 8 is shown analogously to that shown in each case in the basic position in FIGS. 5*a* and 5*b*. If the emergency unlocking device 8 is moved in the emergency actuation direction N for emergency unlocking, first of all the first effective contour 8.2 comes in contact with the blocking element 10.2. Said blocking element comprises a bevel 10.23 which interacts with the first effective contour 8.2 in the manner of a run-on slope in the case of a movement of the emergency unlocking device 8. The blocking element 10.2 is mounted so as to be rotatable and comprises a bore 10.22 for receiving a bolt or another bearing element. In addition, the blocking element 10.2 comprises a spring 10.23, via which it is pretensioned in the blocking direction.

If the emergency unlocking device 8 is moved in the emergency actuation direction N, the first effective contour 8.2 comes into contact with the bevel 10.23, which results in the blocking element 10.2 being pivoted in opposition to the force of the spring 10.23 about an axis which extends through the bore 10.22. Said pivoting movement then results in the blocking device 10 being unblocked.

A further movement of the emergency unlocking devices 8 results in the second effective contour 8.3 coming into contact with the coupling contour 7.1 and the locking device 7 being transferred in opposition to the force of the spring 13 into the unlocked position, as has also been described above with regard to FIG. 7.

The more precise design of the locking device 7 is shown in FIG. 8*b*. It can be seen that the coupling contour 7.1 is arranged on the side of the locking device 7 which is situated opposite the emergency unlocking device 8 so that the emergency unlocking device 8 moves into the locking device 7 during unlocking and then the second effective contour 8.3 strikes against the coupling region 7.2 and, with a further movement, unlocks the locking device 7. In the unlocked position, the tip of the second effective contour projects beyond the locking device 7, as can also be seen in FIG. 7*a*.

LIST OF REFERENCES

1 Hinge closure
2 First hinge element
3 Second hinge element
4 Door
5 Bolt
6 Actuating device
6.1 Coupling edge
7 Locking device
7.1 Coupling contour
7.2 Coupling edge
8 Emergency unlocking device
8.1 Emergency actuation region
8.2 First effective contour
8.3 Second effective contour
8.4 Handling region
8.5 Groove
8.6 Latching edge
9 Guide element
9.1 Projection
10 Blocking device
10.1 Closing cylinder
10.2 Blocking element
10.21 Spring
10.22 Bore
10.23 Bevel
11 Sealing element
12 Receiving means
13 Compression spring
B Actuating rotational axis
N Emergency actuation direction

What is claimed is:

1. A hinge closure comprising:
a first hinge element for arrangement on a door;
a second hinge element for arrangement on a door frame;
a locking device for interlocking the first hinge element and the second hinge element;
an actuating device for actuating the locking device; and
an emergency unlocking device for unlocking the two hinge elements.

2. The hinge closure as claimed in claim 1, wherein the emergency unlocking device and the actuating device are arranged on opposite sides of the hinge closure.

3. The hinge closure as claimed in claim 1, wherein the emergency unlocking device is couplable with the locking device and/or with the actuating device.

4. The hinge closure as claimed in claim 1, further comprising a blocking device having closing cylinder and a blocking element that blocks the actuating device and/or the locking device.

5. The hinge closure as claimed in claim 4, wherein the closing cylinder is arranged on the actuating device and is movable between a blocking position and an unblocking position, and wherein the closing cylinder interacts with the blocking element in the blocking position in such a manner that the actuating device is fixed in relation to the blocking element.

6. The hinge closure as claimed in claim 4, wherein the blocking element and/or the closing cylinder permit the actuating device to be transferred to a locking position when the closing cylinder is in the blocking position.

7. The hinge closure as claimed in claim 1, wherein the emergency unlocking device includes an emergency actuation region for emergency unlocking via the locking device and/or the actuating device.

8. The hinge closure as claimed in claim 7, wherein the emergency actuation region comprises a first effective contour for unblocking the blocking device and a second effective contour for emergency unlocking of the locking device and/or of the actuating device.

9. The hinge closure as claimed in claim 8, wherein the effective contours are arranged so that for emergency unlocking, first the blocking device is unblocked via the first effective contour and then, for unlocking the hinge elements, the second effective contour unlocks the locking device and/or the actuating device.

10. The hinge closure as claimed in claim 8, wherein the locking device comprises a coupling contour, which is designed corresponding to the second effective contour of the emergency unlocking device, wherein in the case of emergency unlocking, the effective contour interacts with the effective contour.

11. The hinge closure as claimed in claim 8, wherein the first effective contour is a notch and the second effective contour is a run-on slope.

12. The hinge closure as claimed in claim 1, wherein the emergency unlocking device is in the form of a drive-in bolt.

13. The hinge closure as claimed in claim 1, wherein the emergency unlocking device is secured against movement in a direction opposite to an emergency unlocking direction in a basic position.

14. The hinge closure as claimed in claim 1, wherein the emergency unlocking device is guided in a guide element and is sealed via a sealing element in relation to the guide element.

15. A door having at least one of the hinge closures as claimed in claim 1.

16. The door as claimed in claim 15, wherein two of the hinge closures are arranged on each of two opposite end regions of the door.

* * * * *